United States Patent [19]
Costello
[11] 3,744,557
[45] July 10, 1973

[54] APPARATUS FOR FUSING AND SEALING PLATINGS AND THE LIKE

[75] Inventor: Bernard J. Costello, Ringoes, N.J.
[73] Assignee: Argus Engineering Company, Inc., Hopewell, N.J.

[22] Filed: July 19, 1971
[21] Appl. No.: 164,095

Related U.S. Application Data
[62] Division of Ser. No. 872,917, Oct. 31, 1969, abandoned.

[52] U.S. Cl. .................... 165/64, 165/65, 29/471.1, 219/349, 219/388, 219/553, 228/47
[51] Int. Cl. .................... F27b 9/12
[58] Field of Search .................... 219/85, 216, 347, 219/349, 388, 354, 405, 411, 553; 29/471.1, 488, 498; 263/8; 228/47; 165/58, 61, 64, 65

[56] References Cited
UNITED STATES PATENTS

| | | | |
|---|---|---|---|
| 2,504,110 | 4/1950 | Davis et al. | 219/388 |
| 2,701,291 | 2/1955 | Cowles | 219/85 |
| 2,987,603 | 6/1961 | Thomson | 219/538 |
| 3,122,492 | 2/1964 | Barnes et al. | 204/157 |
| 3,283,124 | 11/1966 | Kawecky | 219/347 |
| 3,374,531 | 3/1968 | Bruce | 29/498 |
| 3,449,546 | 6/1969 | Dhoble | 219/216 |
| 3,486,004 | 12/1969 | Morrone | 219/385 |
| 3,583,063 | 6/1971 | Growney | 29/471.1 |
| 3,588,425 | 6/1971 | Erickson | 219/85 |
| 3,655,173 | 4/1972 | Costello | 263/8 |

*Primary Examiner*—Volodymyr Y. Mayewsky
*Attorney*—Ostrolenk, Faber, Gerb & Soffen

[57] ABSTRACT

Apparatus for fusing lead-tin platings provided upon printed circuit boards in a continuous process. The boards are moved by suitable conveyor means through a plurality of infrared energy sources provided on groups arranged on opposite sides of said boards and adapted to focus radiant energy to a line image, which plural line images sweep across and irradiate the boards as they pass through the locations of the radiant energy sources. The positioning between the radiant energy sources, the energy level and frequency spectrum of the sources and cooling thereafter is controlled so as to melt the matrix of lead and tin particles to flow together and form an alloy which is metallurgically bonded to the copper conductor while minimizing the propensity of the plating to flow into plated-through holes so as to partially or completely block such holes.

In alloy platings of greater than 1 mil thickness an "air-knife" is provided immediately adjacent the last heating source on either or both sides of the board to produce a precipitous temperature drop from the flow temperature to a temperature slightly above the freeze point to reduce fluidity and mobility of the alloy especially in the region of plated-through holes.

4 Claims, 7 Drawing Figures

COMBINED TEMPERATURE DISTRIBUTION ACROSS PLATED THROUGH HOLE

APPARATUS FOR FUSING AND SEALING PLATINGS AND THE LIKE

This application is a division of application Ser. No. 872,917 filed Oct. 31, 1969, now abandoned.

The present invention relates to radiant energy sources, and more particularly to a novel method and apparatus for fusing platings upon printed circuit boards and the like through the use of plural infrared radiant energy sources to heat the boards on opposite sides thereof and to eliminate the partial or complete blocking of plated-through holes in the boards.

BACKGROUND

In the manufacture of printed wiring boards (and also referred to as printed circuit boards) it is also desirable to deposit a layer of lead-tin alloy on the exposed copper conductors. The advantages of such layers have clearly been recognized by the military and the specific requirements and specifications for such layers are outlined in detail, for example, under MIL SPEC 275–C published by the Federal Government.

The advantages of such layers are:

1. Greatly enhanced shelf life before component assembly.

2. In the case of plated Pb-Sn, the porous surface is sealed and bonded metallurgically to the copper conductor.

3. Further, in the case of Pb-Sn, the constituent metals are fused to the alloy state.

4. Further advantages when using Pb-Sn plating include exposure of etch pits and undercutting of the conductor produced during the copper etch operation which follows the plating operation, thereby greatly facilitating examination of plated and fused printed wiring boards to determine their quality and potential reliability.

The military specifications call for more than 0.3 mils of fused solder alloy upon the (copper) conductor surface. In addition, the military specifications contain other criteria such as alloy composition and surface finish which should be obtained after fusing. The combination of requirements has been difficult to satisfy through the employment of conventional techniques.

The problem lies primarily in satisfying the requirements of minimum plating thickness and the uniformity of thickness. It is relatively easy to apply a heavy coating of solder by dipping or wave coating, or to strip all but a thin layer of solder from the board. In the first instance, the board is unevenly coated and the holes are filled with solder. In the latter method, the exposed surface is a copper-rich alloy of lead and tin that affords little protection against oxide and sulfide formation in storage.

Some of the present methods employed and their requisite disadvantages are set forth below:

1. A lead-tin plating is applied to the printed circuit boards and reflow is obtained by immersing the plated boards in a bath of hot oil (for example, peanut oil). This has been found to be actually the closest that any method comes to the desired solution. The lead-tin plate remains on the board and is fused properly. The disadvatages reside in the fact that the hot oil bath is similar in nature to a French fry cooker. The bath emits noxious odors and is hazardous both from the viewpoint of operator safety and fire safety considerations. Technically, the fusing method tends to cause preferential migration, by gravity, of the alloy, if the board is dipped into the bath in a vertical plane. Dipping in a horizontal plane is quite difficult to perform if the board is large and it has further been found to cause warping due to uneven heating. In addition thereto, thermal equilibrium in the bath tends to cause the solder to fill plated holes by capillary attraction.

2. Another process, normally referred to as the "squeegee" technique, is comprised of applying lead-tin by a hot dip or by a plating process and stripping the plating with hot fluid jets. The method employs high velocity jets of fluid which consists typically of low melting points salts or hydrocarbons, which are directed at an oblique angle to the surface of the circuit board. The hot fluid jets melt and strip away all alloys on the surface whose melting points are exceeded by the temperature of the jets. What results is an extremely thin layer of lead-tin, usually of the order of 50 microinches or less, immediately upon the copper surface. The reason that this extremely thin layer is not removed by the "squeegee" operation is that the layer is rich in copper content and therefore has a higher melting point than the outer layers which have been stripped away.

The disadvantages of this technique are that too much of the solder coating is removed and that the protective layer no longer exists. The resulting circuit board does not satisfy the requirements of being able to withstand temperatures of the order of 275° C. Also, the fluid employed in the squeegee technique is relatively expensive to use since it quickly becomes contaminated with oxides and residual etching and plating salts and must therefore be frequently replenished. As is the case with the first method set forth hereinabove, the hot fluid is a hazard to personnel and property.

3. Still another conventional method which may be employed is one in which the lead-tin is applied to the printed wiring board by means of a hot dip after which the boards are spun (i.e., rotated) at relatively high velocities to remove excess material. The disadvantages of this technique are that the process is very slow and expensive, the coatings are uneven and, in fact, unsatisfactory, only one board may be handled at a time and large size boards are extremely difficult to process.

Additional techniques have been employed in which the process steps of the above-mentioned techniques have been utilized in various combinations, all of which have the attendant disadvantages.

The basic problem to be solved, as defined herein, relates primarily to the processing of lead-tin plated circuit boards. The present day techniques employed for plating have been found to be economical and convenient such that the most common method in general use is codeposition of lead and tin from an electroplating solution of the fluroborate acid type. Thus, the problem becomes one of melting the matrix of lead and tin particles plated upon the board such that they flow together and form an alloy that is metallurgically bonded to the copper conductor and is of the proper thickness. The alloy forming operation must further leave a surface that is, upon solidification, as smooth and bright as possible and is uniformly distributed upon all of the conductors of the printed wiring board. Most importantly, in the case of printed circuit boards having plated-through holes, the propensity of the solder to flow into the holes and partially or completely block the holes must be eliminated or at least minimized to a practical degree. A still further requirement is that of providing a system which may be employed as a continuous process as opposed to batch type processing.

The present invention is characterized by providing a method and apparatus which meets all of the strigent requirements set forth above and which eliminates or avoids all of the disadvantages of present day techniques. The invention utilizes high density infrared heating sources to perform the reflow process in a unique manner. Although other infrared techniques have been utilized for this purpose, they have not been entirely satisfactory for a number of reasons which will become evident upon a closer consideration of the present invention results.

The apparatus of the present invention is comprised of first and second groups of focussed infrared heating devices mounted so as to radiate respective opposing surfaces of printed wiring boards movable through the groups of radiation devices, preferably by means of adjustable belt conveyors (adjustable as to the width of the boards) or, alternatively, being comprised of an open-mesh metallic construction to permit the irradiation of the board through the conveyor. The infrared devices are each constructed and arranged to produce a line of radiation which is oriented transverse to the direction of travel of the circuit boards. Thus, the conveyor traverses the series of focus lines of radiation provided by each infrared heating device, in sequential fashion. The sequence is significant in the sense that the power level and positioning of the series of heating units can be used to advantage to cause different effects in the end result.

In operation, the heating units are normally energized continuously and the conveyor is moved continuously. The circuit boards having a lead-tin plating are further coated with a liquid flux and placed upon the conveyor for movement preferably in a horizontal plane. The conveyor carries each board between the heating systems at preset speed, whereby the plating is melted and fused. A typical speed is 1" per second. The boards are cooled by convection after fusing by the ambient temperature, i.e., by free air cooling.

By simultaneously heating both sides of the boards being processed it has been found that the heating rate of the plated layer is more than doubled and said layers are found to be heated to the flow point without overheating the laminate, in spite of the fact that the laminate (i.e. the substrate) is heated in the process. The provision of a plurality of heating devices in each of the groups positioned above and below the board permits a variety of different heating profiles to be obtained as each board traverses the series of lamps. For example, the first few lines of focus radiation may be adapted to achieve a fast temperature rise within the board, while the remaining lamps of each group may be set at lower energy levels to achieve a plateau at the flow point. Obviously, many other combinations are conceivable to achieve the desired result. In instances where the boards being processed are provided with plated-through holes, the thermal gradient achieved across such plated-through holes has a minimum value at the midpoint of the holes between the opposed surfaces of the board and is a maximum at the openings of the holes located at each surface. This thermal gradient successfully counterbalances the propensity of the molten material to flow into the hole and thereby prevents partial or complete filling of the holes which is an undesirable result encountered in conventional techniques.

The ability of the thermal gradient to hold the molten alloy on the surface of the board and to prevent the filling of plated-through holes has been found to be of marginal effectiveness when the plating thickness is greater than 1 mil.

THEORY

It is generally accepted that lead-tin plating exists not as an alloy, but as discrete particles of lead and tin in a tight matrix structure. The melting point of lead is significantly higher than the melting point of tin which, in turn, is significantly higher than the eutectic alloy melting point. Since the eutectic alloy is the lowest melting alloy and is the strongest alloy, it is desirable to maintain the lead-tin ratio as close to the eutectic alloy as possible.

A related phenomenon in the fluidity of molten solder is a function of temperature. As the temperature is increased above the liquidus point for a particular alloy, the fluidity, or mobility, of the alloy is enhanced and it tends to flow or run more readily than at lower temperatures.

PROBLEM

Considering the sequence of events experienced by a matrix of lead-tin as it is fused and alloyed, the temperature required to melt the tin constituent is 450°F. At this point, the tin is available in a molten form to wet the lead and cause alloying along the interfaces of neighboring particles. The eutectic point is above the melting point of the solder and the alloy is much more fluid than is necessary for effective wetting to occur with the copper laminate. The enhanced fluidity results in surface tension which is sufficient to cause the alloy to flow from the surface and into the plated-through holes, provided there is sufficient solder to feed the hole. The filling propensity is found to be enormously enhanced at plating thicknesses of greater than 1 mil.

SOLUTION

The solution to the problem lies in the fact that all of the processes which occur during the formation of the alloy require some finite time to react. It is, therefore, desirable to heat and cool as rapidly as possible both before and after the melt and flow stages of the process. For this purpose, the heating methoc described hereinabove may be employed. The cooling method utilizes a fast air cooling system positioned immediately behind the final heating devices. The well defined air blast is intended to produce a precipitous temperature drop from the flow temperature which is greater than 450°F to a temperature slightly above the freeze point, which drop is for the purpose of simply reducing fluidity and mobility of the alloy. Preferably, slotted air tubes are positioned immediately behind the last heating device on either side or both sides of the board. The slots act as a nozzle to direct the air against the board and cause the fumes and smoke to be blown away from the heating zone. The distance, height and angular position of the slotted openings may be adjusted to achieve optimum results.

Present methods for clearing the solder from plated-through holes due to reflow consist of the following:

1. In the use of a hot oil reflow technique, the boards are simple "slapped" against a flat surface to knock the solder out. This process is tedious and almost impossible to control, and is not mechanizable.

In other plating techniques, small slugs of silicone rubber may be pressed into the holes to prevent filling thereof. This technique is tedious, is extremely expensive and further impedes free melting of the solder in the hole.

The use of the air-knife overcomes all of these disadvantages while providing a technique for completely counteracting the propensity of the solder to flow into and fill up plated-through holes in printed wiring boards wherein platings of greater than 1 mil thickness are required.

It is, therefore, one object of the present invention to provide a novel method and apparatus for fusing plated layers on printed wiring boards and the like by means of simultaneously irradiating both surfaces of the boards being processed in a continuous manner to provide a good alloy bond between the layer and the underlying copper conductors and whose surface is smooth and free of imperfections and is of the required uniform thickness.

Another object of the present invention is to provide a novel method for fusing plated layers provided upon printed circuit boards comprising the steps of simultaneously exposing both surfaces of each board being processed to radiation which lies in or near the infrared range and which is comprised of focus lines of radiation which sequentially scan the board being processed to fuse the plated layer to the underlying printed wiring members without unduly heating the printed wiring board substrate, as well as overcoming the propensity of the layer being fused to fill plated-through holes which may be provided in the boards.

Still another object of the present invention is to provide a novel method and apparatus for fusing plated layers on printed wiring boards and the like by means of simultaneously irradiating both surfaces of the boards being processed in a substantially continuous manner and rapidly cooling the boards immediately after they pass out of the irradiating phase so as to rapidly reduce the fluidity and mobility of the alloy and thereby provide a good alloy bond between the layer and the underlying copper conductors as well as preventing the inflow and filling of plated-through holes in the printed wiring boards while at the same time providing plating surfaces which are smooth and free of imperfections and which are of the required uniform thickness.

These as well as other objects of the present invention will become apparent when reading the accompanying description and drawings in which.

FIG. *3a* is a sectional view of a portion of a printed wiring board containing a plated-through hole.

FIG. *3b* is a plot showing the combined temperature distribution of the plated-through hole shown in FIG. *3a* to facilitate an understanding of further advantages of the invention.

Figure 4:
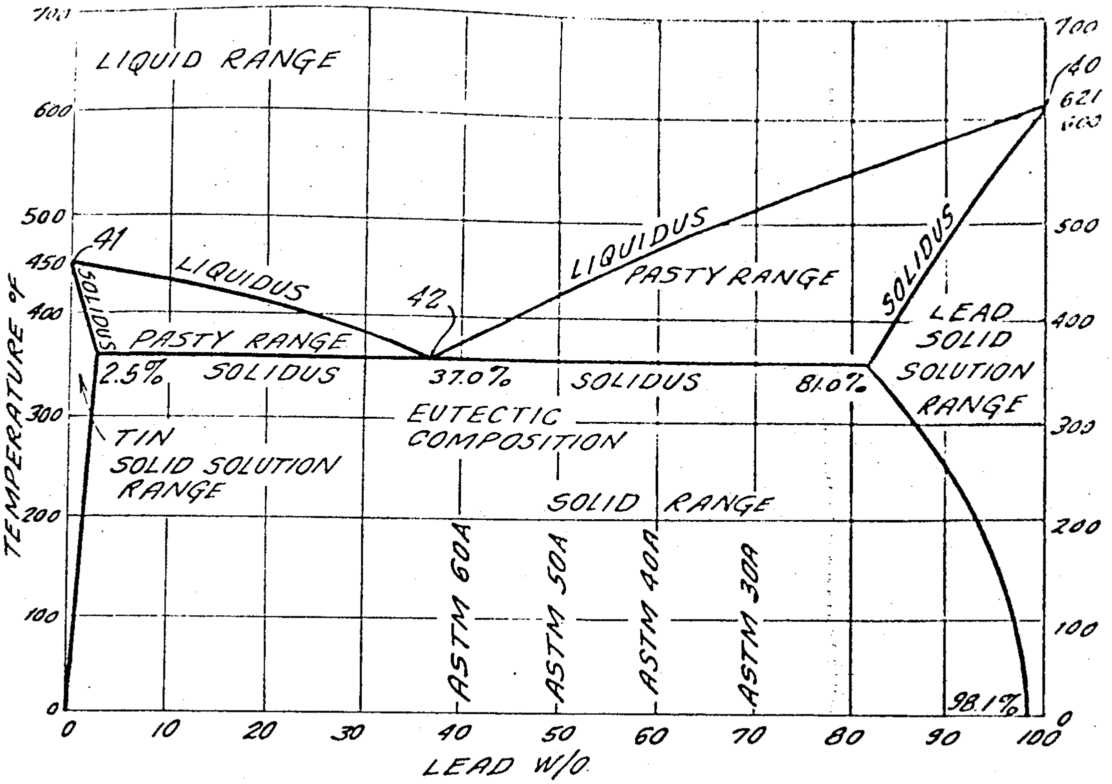

FIG. 4 is a plot showing an engineering version of the lead-tin phase diagram.

Figure 1:
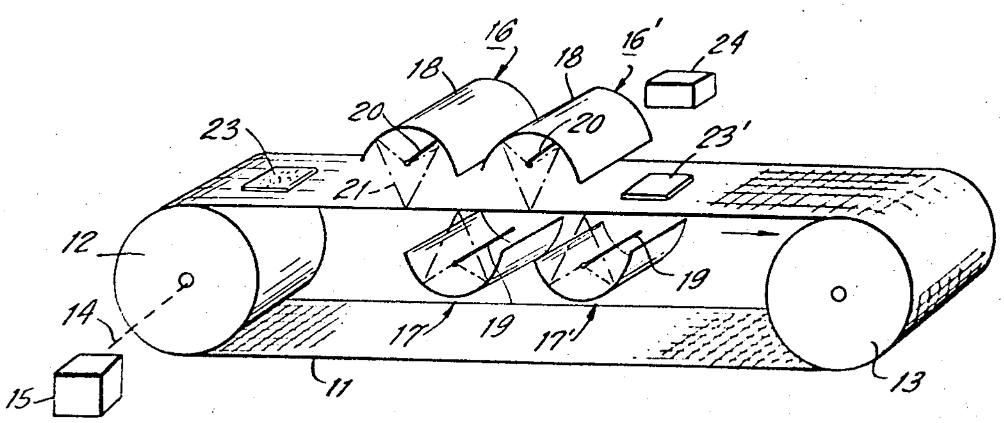
FIG. 1 shows the apparatus embodying the principles of the present invention utilized for fusing plated layers of printed circuit boards.

FIG. *5a* shows an apparatus which constitutes an alternative embodiment to that shown in FIG. 1.

FIG. *5b* is a perspective view showing a portion of the apparatus of FIG. *5a* in greater detail.

BACKGROUND AND UNDERLYING THEORY

Printed wiring boards are normally comprised of an insulating substrate having a conductive coating deposited thereon in a pattern which represents an electrical circuit or a portion of an electrical circuit. The manner in which the printed wiring pattern is formed is well known in the art and any desirable techniques can be utilized to this end. Printed wiring boards in which the printed wiring is comprising of a copper coating are usually protected against oxide and sulfide formation upon the copper by providing a plated layer which may, for example, be a lead-tin alloy deposited upon the exposed copper. The first operation is that of plating the copper coatings with a lead-tin composition. This composition is not deposited in the form of an alloy, but as discrete particles of lead and tin. These particles are characterized by having melting points greater than the melting point of the alloy formed by their marriage. For this reason, the temperature required to initiate alloy formation and flow is appreciably higher than the eutectic point of the metallurigical system. In the case of lead-tin, it has been found that temperatures in the range of 465°–500°F are necessary to achieve the desired flow, while the eutectic temperature is approximately 361°F.

When flow occurs at this elevated temperature (preferably within the above-mentioned temperature range), the resulting alloy is further required to wet and become metallurgically bonded to the underlying copper conductor. However, it is not desirable to hold the alloy, in the molten state, longer than is absolutely necessary, because it is corrosive in this state and will rapidly become rich in copper content as a result of the flow of the copper from the conductor into the alloy material. This copper contamination produces a grainy and gritty surface upon solidification. As was previously mentioned, it is not only desirable but very often required that the resulting alloy surface be both smooth and clean. While the resulting grainy and dull surface is not in itself an absolute indicator of potential solderability problems, the presence of a smooth surface gives almost 100 percent assurance of good solderability. For this reason, the smooth surface is extremely desirable.

The further undesirable aspect of copper contamination is its tendency to raise the melting point of the deposited layer and cause subsequent soldering operations to require a higher soldering temperature to wet the surface and thereby provide a good solder joint. Therefore, it is desirable to heat the plated deposit to an amount sufficient to produce free and clean flow, to hold the layer at this temperature for as short a period as possible, and to cool the layer at a rate that will produce a uniform and blemish-free surface. The cooling rate also performs an important role in its contribution to surface finish. The most desirable objective is to have the entire surface freeze simultaneously and as quickly as possible. If the underlayments are not overheated, ordinary free air-cooling is normally fast enough to produce the desired effect. However, if faster cooling is desired, it has been found effective to use a low velocity-high volume fan to assist the cooling rate.

The effect of fast cooling are well known in the metallurgy field. The grain size in the resulting metal structure is inversely proportional to the cooling rate. Therefore, fast cooling produces small grains and a smoother, brighter surface.

The above theory thus leads to a conclusion that a "skin" heating effect in the conductor paths is most desirable, while the underlayments, although being heated, should not be overheated. This surface heating must be rapid and of short duration at the flow point. The surface must also be cooled rapidly to promote small-grain growth in the freezing solder.

The solution which I have devised, which utilizes high intensity focussed infrared heating, has been found to satisfy all the requirements of the theory. The first requirement, namely skin heating of the conductors, is achieved by heating the circuit board from both sides simultaneously. FIG. 1 shows apparatus employed in the performance of the process, and is comprised of a closed loop conveyor belt 11 of an open mesh metallic construction which is entrained around a pair of elongated rollers 12 and 13 arranged to rotate about their longitudinal axes. One of said rollers, for example roller 13, may be mechanically coupled (as represented by dotted line 14) to a drive motor 15 for rotating roller 12 and hence conveyor 11. As an alternative to providing a conveyor 11 of open-mesh construction, conveyor 11 may be substituted by a plurality of slender conveyor belts entrained about the rollers 12 and 13 and positioned in spaced parallel fashion so as to receive and support parallel marginal edges of printed circuit boards in a manner to be more fully described.

A plurality of focussed infrared heating devices 16, 16' are positioned above conveyor 11 while a plurality of similar focussed infrared heating devices 17, 17' are positioned below the top surface of conveyor 11. Each of the devices 16 through 17' is comprised of a reflector member 18 which may preferably have an elliptical-shaped cross-sectional configuration and be provided with a concave surface which is highly reflective to infrared radiation.

A "line" source of infrared radiation 19 is aligned so as to be coincident with the primary focus of the reflector whereby infrared rays 20 emitted from each "line" source and impinging upon their reflective concave surface, are reflected at 21 at an image focus so as to yield a line image substantially of the length and dimensions as the "line" radiation sources 19.

Arrow 22 represents the direction of travel of conveyor 11. The printed wiring boards such as, for example, board 23 is positioned upon the left-hand end of conveyor 11 so as to pass beneath and come under the influence of the infrared heating devices. The devices each produce a line of radiation which is oriented in a direction transverse to the direction of travel of the conveyor. Thus, each printed wiring board, as shown by wiring board 23, for example, traverses the series of focus lines of radiation from each infrared heating device in sequential fashion until passing beyond the last heating device at the position shown by board 23', for example. The sequencing of the heating devices may be adjusted as to power level and spacing between adjacent heating devices so as to yield different effects in the end result.

In operation, the heating units are normally energized continuously, and the conveyor 11 is moved continuously by energized motor 15. The circuit boards are preferably coated with a liquid flux and placed upon the conveyor in a horizontal plane. The conveyor carries each board such as, for example, board 23, between the heating systems at a preset speed whereby the plating is melted and fused. Typical speed may, for example, be 5 feet per minute. Once the boards reach the position occupied by board 23', they may be removed from the conveyor and either washed or stacked for further processing.

Several important points and advantages of the infrared system will become clear upon examination of the heating mechanism, and the structure to be heated, in detail.

Firstly, considering the lead-tin structure as it is plated, the metals are deposited not as an alloy but as discrete particles of lead and tin. These particles are characterized by having melting points greater than the melting point of the alloy formed by their marriage. For this reason, the temperature required to initiate alloy formation and flow is appreciably higher than the eutectic point of the metallurgical system. In the case of lead-tin, it has been found that temperatures in the range from 465° to 500°F are necessary to achieve the desired flow, while the eutectic temperature is 361°F.

When flow occurs at the elevated temperature, the alloy is required to wet and metalluragically bond to the underlying copper conductor. However, it is undesirable to hold the alloy, in the molten state, longer than is absolutely necessary, because it is corrosive and will rapidly become rich in copper from the conductor. The copper contamination produces a grainy and gritty surface upon solidification. As was stated previously, it is very desirable to have a smooth and clean surface. While the grainy and dull surface is not in itself an absolute indicator of potential solderability problems, the presence of a smooth surface is almost 100 percent assurance of good solderability. Therefore, the smooth surface is very desirable.

A further undesirable aspect of copper contamination is its tendency to raise the melting point of the deposit and cause subsequent soldering operations to require a higher temperature in order to satisfactorily wet the surface. Therefore, it is desirable to heat the deposit enough to produce free and clean flow, to hold it at this temperature for as short a period as possible, and to cool at a rate that will produce a uniform and blemish-free surface. The cooling rate is important to the surface finish. The most desirable objective is to have the entire surface freeze simultaneously and as quickly as possible. If the underlayments are not overheated, ordinary free air cooling is normally fast enough to produce the desired effect. If faster cooling is desired, it has been found effective to use a low velocity-high volume fan 24 positioned just after the last infrared heating device for assisting the cooling rate.

The theory so far leads us to the conclusion that we want a "skin" heating effect in the conductor paths while heating, but not overheating, the underlayments. This surface heating must be rapid and of short duration at the flow point. The surfaces must also be cooled rapidly to promote small grain growth in the freezing solder.

Figure 2:
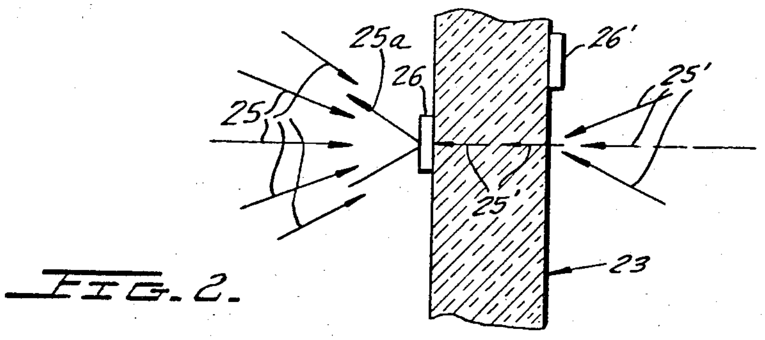
FIG. 2 shows a sectional view of a portion of a printed wiring board, which view is useful in explaining the advantages of the present invention.

The solution devised hereinabove utilizing high intensity focussed infrared heating satisfies all the requirements of the theory. The first requirement: skin heating of the con-ductors, is achieved by heating the circuit board from both sides simultaneously through the use of the groups of infrared heating devices 16,16′ and 17,17′, respectively. Considering FIG. 2, a portion of a printed circuit board 23 is shown therein in great detail. Infrared rays 25 are directed to the surface of a conductor 26 provided upon one surface of the insulating substrate 27, as well as impinging upon all other surfaces on that side of the board. The surface of the conductor is, in the plated state, a whitish matt-finish having an emissivity of about 0.28. Therefore, an appreciable amount of energy is absorbed. However, a larger percentage is reflected, as shown by reflected ray 25*a*. This reflected radiation is thus unavailable for heating.

Since it is desired to maximize the heating rate, consider the energy in the form of infrared rays 25′ directed toward the printed wiring board from the opposite focussed heating device. This energy is of such a wave length that a substantial portion thereof penetrates the laminate or substrate 27 and is absorbed in the interface between the conductor and the laminate. This surface is often oxidized to enhance adhesion to the substrate, and it is very efficient in the absorption of radiant energy. We now have a situation in which the conductor is irradiated from both sides. We find that this condition more than doubles the heating rate of the skin. Also, it enables the skin to be heated to the flow point without overheating the laminate.

The presence of conductors (26 and 26′) on both sides of the board provides a minimum shielding effect in all but one type of situation. This is the case wherein both sides of the board are covered with larger conductor areas and very little open areas are available for penetration. Since boards of this type are usually quite rare, the system is thereby advantageous for use in a wide variety of boards which occupy the largest percentage of printed wiring board types.

Considering now the significance of the use of multiple heating units exposing each printed wiring board in sequence, as stated earlier, it is desirable to heat the plating as rapidly as possible and to hold it at the flow point no longer than is necessary. Both of these factors will vary widely with the type and geometry of the circuit board. Therefore, it is desirable to have flexibility in the system, not only with respect to placement of the infrared heating devices, but also to provide an ability to vary the power output for each heating unit to achieve a given heating profile as each board traverses the series of lamps. For example, it is often desirable to have the first and second lamp operate at power levels as high as possible to achieve a fast temperature rise. The next two lamps may then be set at lower energy levels to achieve a plateau at the flow point. Obviously, this arrangement presupposes that as many as four lamps (or more) may be utilized on each side of conveyor 11. Obviously, many other combinations are conceivable to achieve the desired effect. For this reason, FIG. 1 shows only two heating devices provided on each side of conveyor 11, it being understood that this arrangement is shown for purposes of simplicity only and that the total number of heating devices provided is dependent upon the geometry of the board and the particular heating profile desired.

Additional problems in printed wiring reflow relate to plated-through holes in the circuit board. A plated-through hole serves as a conductor path between the opposing planar surfaces of the board and also as an aid in promoting capillary wetting when the components are attached to the board.

When reflowing lead-tin plating, the plated-through holes tend to attract solder by surface tension. The interior surface will thus become smaller as the hole is filled. Therefore, an unstable force balance exists, caused by surface tension, so as to promote the progressive filling.

Some counter-force must be provided to offset this tendency. A partial solution lies in the selection of a proper flux that will remain stable and maintain a surface film upon the molten metal. However, this is found to be insufficient to overcome the filling tendency if unaided by any additional techniques.

Figure 3A:
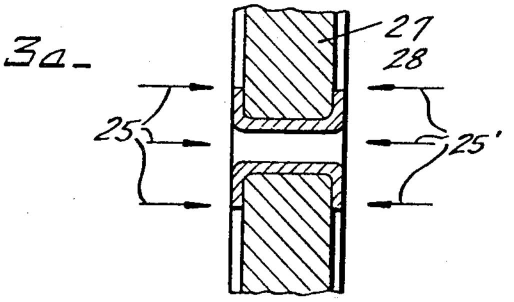
Figure 3B:
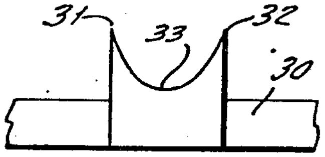

I have found that the previously mentioned skin heating effect achieved in the system described hereinabove serves to provide the additional force necessary to keep plated-through holes clear. This force comes from the thermal gradient that is set up between the surface of the printed wiring board and its underlayments. It is well known that molten metal tends to travel toward a higher temperature area. The skin heating effect caused by the system described herein provides a thermal gradient in the hole that reaches a minimum at the midpoint and a maximum at the opening. Considering FIGS. 3*a* and 3*b*, the insulating substrate 27 is shown as being provided with an opening 28 which is plated with a copper layer 29 to provide a conductive path between opposing surfaces of the printed wiring board. FIG. 3*a* shows infrared radiation in the form of rays 25 and 25′ impinging upon both surfaces of the printed wiring board as the result of the use of the system shown in FIG. 1. FIG. 3*b* is a plot showing the combined temperature distribution (i.e. thermal gradient) across the plated-through hole 28, shown in FIG. 3*a*. Horizontal line 30 represents the melting point of the solder (which may be a lead-tin alloy). As can clearly be seen, the highest temperatures are achieved at the opposing surfaces of the board represented by points 31 and 32. The temperature reduces rapidly toward the center of the hole 28, as represented by the substantially U-shaped curve portion 33, if the energy level is sufficient to provide rapid surface heating.

Tests have shown that this gradient is sufficient to maintain clear holes provided the plating thickness is less than 1 mil. It has also been found experimentally that holes which have been successfully fused without filling will tend to fill if heated to equilibrium. It is, therefore, conclued that a great advantage is provided by the system described herein in those cases where the plating is less than 1 mil. Virtually all the printed wiring requirements in the electronic industry falls within this category.

Prior to the present time, infrared techniques have been used with very limited success in plating operations described herein. Most problems relate to the emissivity of the structure being heated and the energy density and spectral distribution of the heater.

The energy density of commonly used infrared heaters is less than 5 kilowatts per square foot. The system described hereinabove is capable of providing an energy density of 4 kilowatts in mutually exclusive zones measuring as small as 0.5 x 10 inches as developed by the focussed heating devices 16, 16′, 17 and 17′ respectively. This arrangement thereby achieves the aforementioned ability to heat at a very rapid rate and to program a thermal profile through the system on closely spaced increments which may be spaced by distances as small as two inches.

Another advantage derived from the system described herein relates to the spectral energy distribution. I have achieved a combination of short wave length visible and near infrared energy that is readily absorbed in the lead-tin plating while maintaining the ability to penetrate most commonly used printed wiring laminates. It is, therefore, possible to rapidly heat the conductor paths while avoiding overheating of the laminate.

Another general advantage derived from reflow plated printed wiring boards in which the plating has a smooth, clean and uniform surface resides in the fact that the surface is very instrumental in determining the quality of the printed wiring board. The completion of the reflow process for the alloyed plating results in the production of enlarged pits in the vicinity of etch pits which may have occurred during the production of the copper layer. The rather pronounced openings which form above etch pits or in the region of undercut copper conductors, which may accidentally be produced during the copper etch operation, greatly facilitates visual inspection of printed wiring boards to determine their quality and reliability.

The techniques described hereinabove have been found to be effective in instances where less than 1 mil of plating is deposited upon the printed wiring board. The alternative preferred embodiment to be described hereinbelow consists of a system which is utilized for the purpose of overcoming the hole filling phenomenon in cases where platings of greater than 1 mil thickness are to be provided upon printed wiring boards.

It is generally accepted that lead-tin plating exists not as an alloy, but as discrete particles of lead and tin in a tight matrix structure. Making reference to FIG. 4, which shows a lead-tin phase diagram, it can be seen that the melting point 40 of lead is 620°F, while the melting point 41 of tin is 450°F, and the eutectic alloy melting point 42 is 361°F. Since the eutectic alloy is the lowest melting alloy and the strongest alloy (in percentage proportion of lead and tin), it is desirable to maintain a lead-tin ratio as close to the eutectic alloy as possible.

A related phenomenon is the fluidity of molten solder as a function of temperature. As the temperature is increased above the liquidus point for a particular alloy, the fluidity, or mobility, of the alloy is enhanced and it tends to run, or flow, more readily than at lower temperatures. The liquidus curve is commonly referred to as that line which connects temperatures at which fusion is just completed for the various compositions.

Considering the sequence of events experienced by a matrix of lead-tin as it is fused and alloyed, the temperature required to melt the tin constituent is 450°F. At this point, the tin is available in a molten form to wet the lead and cause alloying along the interfaces of neighboring particles. As this alloying occurs, the melting point of the alloy is once again apparent from FIG. 4. The alloy melting point is always lower as one proceeds toward the right from the zero percentage lead line. Of course, the liquidus curve rises to meet the 450°F line at 55 percent lead, but this is far beyond the eutectic point 42 which is optimum.

Let it be assumed that the eutectic alloy state has been achieved. At 450°F, this point is 89°F above the melting point of the solder. The alloy is much more fluid than is necessary for effective wedding to the copper laminate. The enhanced fluidity results in surface tension sufficient to cause the alloy to flow from the surface and into plated-through holes, provided there is sufficient solder to feed the hole. It has been found that the hole filling propensity is enormously aided at plating thicknesses greater than 1 mil.

Thus, in order to significantly reduce and preferably eliminate the propensity of the solder to fill the plated-through holes, I have developed a solution whose success lies in the fact that all of the processes require a finite time in which to react or occur. It has, therefore, been found desirable to heat and cool as rapidly as possible before and after the melt and flow stages of the process. The heating system which may be employed to achieve these results may be of the type described hereinabove with regard to FIG. 1.

The cooling method which has been briefly mentioned hereinabove as an aid to produce rapid freezing and the attendant fine grain surface differs from the rapid cooling desired under the present requirements which preferably employs a fast air cooling system located immediately behind the final heating lamp. This air blast is intended to produce a precipitous temperature drop from the flow temperature, which is greater than 450° F, to a temperature slightly above the freeze point. This drop is not intended to freeze the alloy, but merely to reduce its fluidity and mobility. Also, freezing in a high velocity air blast would cause excessive roughness on the hardened surface.

Figure 5A:
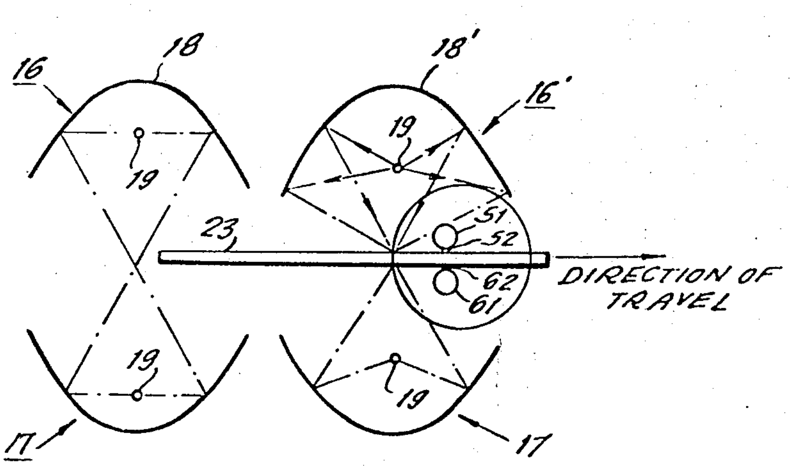

The apparatus utilized to perform the necessary functions is shown in FIG. 5a, wherein like numerals designate like elements as between FIGS. 5a and 1. Heating of the printed wiring boards is obtained from the mutually opposed pairs of focussed radiant heating devices 16–16' and 17–17', respectively. As was previously described, a greater or lesser number of heating devices may be provided on opposing sides of the conveyor. It should also be noted that an unequal number of heating devices may be employed on opposing sides of the conveyor, the exact number selected being dependent only upon the desired heating profile. The heat zones are preferably focussed "line" images which are less than one inch wide and aligned transverse to the direction of circuit board travel. Positioned immediately behind the last lamp on either or both sides of the board, and outside the converging radiation from the lamps, a slotted air tube 51 (and 61) is provided. Each air tube may be closed at one end and coupled to a suitable source of high velocity air at one end thereof. Alternatively, each slotted tube may be open at both ends and coupled through a pair of conduits to the high velocity air source, which may, for example, be a fan or blower.

Figure 5B:
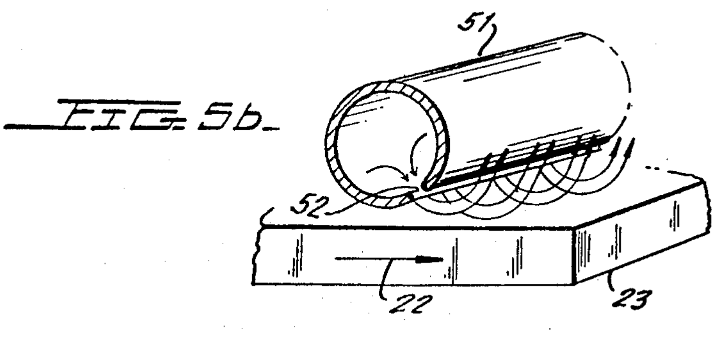

As shown best in FIG. 5b, the narrow slot 52 (62 in the case of tube 61) acts as an elongate nozzle to direct the air against the board and to cause the fumes and smoke to be blown away from the heating zone, as shown by the arrows 53. The tubes may be mounted upon suitable adjustable fixtures (not shown) to enable the tubes to be positioned at any desired distance from the heat zone and at any height above the board. Preferably, the adjustable support means may be further provided with pivot means to rotate the slotted openings 52 and 62 for adjusting the impingement angle of the air upon the board.

The length of the elongated slots are preferably sufficient to handle boards having a variety of widths. The width of each slot may, for example, be within the range from 0.005 to 0.010 inches. In one preferred embodiment a fan (or blower) capable of moving air at a rate of 50 CFM has been found to be quite satisfactory for producing the desired abrupt temperature drop.

As was previously mentioned, in reflow plating systems employing hot oil, the operation of clearing the solder from plated-through holes due to reflow is an after-the-fact operation in which the board is simply slapped against the flat surface, hopefully to knock the solder out. This operation is tedious, awkward, almost impossible to control and is not capable of being readily mechanized.

The further alternative of force-fitting small slugs of silicone rubber into the holes is an extremely expensive procedure due to the large number of plated-through holes found in a typical board, and this method further is found to impede the free melting solder in the hole which is necessary to provide the desired plating in each hole.

It can be seen from the foregoing description that the present invention provides a novel method and apparatus for forming a good alloy bond of solder material upon copper conductors provided on printed wiring boards wherein smooth, uniform plating surfaces of a good bond are formed by simultaneously irradiating both sides of each board being treated, and wherein the propensity of molten solder to flow into and fill up plated-through holes is prevented by the characteristics of the heating technique in printed wiring boards having platings of less than 1 mil thickness and wherein an abrupt cooling step is utilized immediately after the last heating unit to prevent the solder from filling in plated-through holes in printed wiring boards having platings of greater than 1 mil thickness.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims. For example, the focussed radiant heating devices may be substituted by cylindrical-type induction heaters positioned such that the heated zone is narrow and aligned transverse the direction of board travel.

I claim:

1. Apparatus for alloying and bonding a solder type of plating previously applied to the conductive surfaces of printed wiring boards comprising:

a conveyor for supporting and conveying the printed wiring boards along a linear path;

means for moving said conveyor at a predetermined rate;

first radiant energy heating means for directing radiant energy toward one side of said conveyor to create a first heating zone;

second radiant energy heating means for directing radiant energy toward the other side of said conveyor to create a second heating zone;

said conveyor being of an open structure to permit passage of said radiation to that side of said printed wiring board contacting said conveyor;

said first and second radiant energy heating means being adapted to direct the radiant energy in each of their associated zones upon the opposing surfaces of said boards as they pass between said first and second radiant heat zones to heat said plating to a temperature sufficient to cause said plating to form an alloy and bond said alloy upon said printed wiring board conductive surfaces;

cooling means positioned immediately following said heating zones for directing moving air upon at least one surface of said boards;

said heating means each being comprised of a source of radiant energy lying within the visible and near infrared wavelengths;

reflector means for directing radiation from said source and impinging upon said reflector upon an associated surface of said printed wiring board.

2. The apparatus of claim 1 wherein said cooling means further comprises a narrow, elongated outlet opening for constraining the air passing therethrough into a narrow, elongated zone positioned immediately behind the last heating zone.

3. The apparatus of claim 2 wherein said outlet opening is aligned so as to cause air passing through said outlet opening to move in a direction diagonally aligned with the surface of the boards so as to direct heat and fumes away from said heating zones.

4. The apparatus of claim 2 wherein said cooling means is adapted to include means for moving air through said outlet opening at a velocity sufficient to rapidly cool each board passing through the cooling zone to a temperature level slightly above the freeze point of the plating composition to reduce the mobility of the compostion to a degree sufficient to prevent the composition from flowing into and filling plated-through holes provided in the boards.

* * * * *